United States Patent Office 3,325,272
Patented June 13, 1967

3,325,272
PLANT GROWTH CONTROL METHODS AND
COMPOSITIONS
John W. Hamaker, Walnut Creek, Calif., and Robert T.
Martin, Kuau, Hawaii, assignors to The Dow Chemical
Company, Midland, Mich., a corporation of Delaware
No Drawing. Filed June 23, 1965, Ser. No. 466,469
15 Claims. (Cl. 71—2.5)

This application is a continuation-in-part of our prior application Ser. No. 258,901, filed Feb. 15, 1963, which in turn is a continuation-in-part of application Ser. No. 177,757, filed Mar. 6, 1962, both now abandoned.

This invention is related to plant growth control and is particularly directed to compositions and methods for regulating the growth of plants and seeds, both aquatic and terrestrial.

In plant growth control, the methods and compositions of the present invention are useful in the various applications of the art of growth control for which compounds having plant hormone activity are suitable. For example, the compositions and methods of the present invention may be employed to speed up, inhibit or arrest the germination of seeds, or to stimulate or suppress the formation of roots, buds and flowers. They may be used as herbicides to kill undesirable plants and weed seeds. They may also be used to produce seedless fruits without the use of pollen (parthenocarpy), and to prevent or retard the formation of the abscission layer on fruit trees, thereby preventing premature fruit drop. Other applications include causing fruit drop, setting of flowers and defoliating plants. In addition, the compositions may be applied to eradicate the lower or parasitic plants.

It is the object of the present invention to provide novel compositions and methods for treating plants and plant parts and their habitats to stimulate, inhibit or otherwise control the growth of plants. Another object of the present invention is to provide methods and compositions for the selective growth of plants. Still another object of the present invention is to provide novel compositions and methods for the eradication of weeds. Other objects will become apparent from the following specification and claims.

According to the present invention, it has been discovered that germination, growth, eradication or special control of plant or plant parts may be obtained by applying to plant parts or to the habitats of plants, a growth controlling amount of a 4-amino-3,5-dichloropicolinic acid compound.

By "4-amino-3,5-dichloropicolinic acid compound" is meant the parent amino acid and derivatives thereof wherein the amino and carboxyl groups may be further substituted or modified. Thus, the amino group may be substituted with one or more alkyl or hydroxyalkyl groups and the carboxyl group may be replaced by a carboxylic acid salt, amide, ester or hydrazide group.

The 4-amino-3,5-dichloropicolinic acid compounds useful in the methods and compositions of the present invention may be represented by the formula

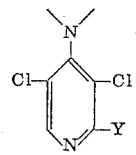

(I)

wherein —N< is a residue of a nitrogen base having a basic dissociation constant of $10^{-7}$ or greater and Y is a carboxylic acid derived group selected from the group consisting of carboxylic acid, carboxylic acid salt, carboxylic acid hydrazide, carboxylic acid ester and carboxylic acid amide.

The amino group, —N<, in the above formula embraces residues of such bases as ammonia, aliphatic, alicyclic and heterocyclic mono- and polyamines, as well as such basic or amino compounds as guanidine, hydrazine and substituted hydrazine, and which have a basic dissociation constant of at least $10^{-7}$. The apparent oxidation state of the amino nitrogen is from $-3$ to $0$. The free valences may be satisfied with radicals such as hydrogen, alkyl, alkenyl, alkynyl, hydroxyalkyl, aralkyl, cycloalkyl, amino, dialkylamino, guanyl, aminoalkyl, poly(aminoalkylene)aminoalkyl, pyridyl, pyrimidinyl, triazinyl; alternatively, the free valences may be joined with a divalent group which with the nitrogen forms a heterocyclic ring such as ethyleneimine, trimethyleneimine, pyrrolidine, alkylpyrrolidine, piperidine, alkylpiperidine, piperazine, alkylpiperazine and morpholine. Moreover, the compounds of the present invention embrace those having two trichloropicolinic acid nuclei, joined either directly through the nitrogen or through a divalent group interconnecting the nitrogens; these compounds may be better illustrated by a modified formula

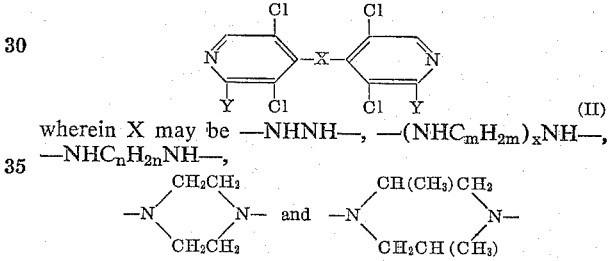

(II)

wherein X may be —NHNH—, —(NHC$_m$H$_{2m}$)$_x$NH—, —NHC$_n$H$_{2n}$NH—, wherein $m$, $n$ and $x$ are integers from 1 to 4, inclusive, or alkylene diamines which may have aminoalkyl or hydroxyalkyl substituents.

Nitrogen base suitable in forming the amino group have defined embrace such amines and basic nitrogen compounds as are hereinafter disclosed. Suitable aliphatic monoamines include mono- and dialkylamines, alkenylamines, alkynylamines, hydroxyalkylamines and aralkylamines such as ethylamine, n-propylamine, isobutylamine, sec.-butylamine, sec.-amylamine, 2-methyl-n-butylamine, 1,3-dimethylbutylamine, n-hexylamine, 3-amino-n-hexane, 4-amino-n-hexane, 2-amino-n-heptane, n-nonylamine, n-octylamine, decylamine, undecylamine, dodecylamine, tetradecylamine, hexadecylamine, 1,1,3,3-tetramethylbutylamine, 2-amino-2-methylbutane, pentadecylamine, heptadecylamine, hexahydrobenzylamine, and other monoalkylamines containing from 1 to 18 carbon atoms, inclusive; diethylamine, diisopropylamine, di-n-butylamine, ethylmethylamine, diisoamylamine, dioctylamine, methylisopropylamine, N-methyldecylamine, N-methyl-sec.-butylamine, N-methyldodecylamine, N-methyltetradecylamine, N-methyloctadecylamine, N-ethyloctadecylamine, ethylpropylamine, N-n-butyltetradecylamine, bis(1,3-dimethylbutyl)-amino, N-methyl-2-amino-n-pentane, di-n-heptylamine and other dialkylamines containing from 2 to 20 carbon atoms, inclusive; allylamine, methallylamine, oleylamine, 5-amino-1-pentene, 5-amino-2-hexane and other alkenylamines containing from 3 to 18 carbon atoms, inclusive; α-phenylethylamine, β-phenylethylamine, 1-phenylpropylamine, 2-phenylpropylamine, α-amino-n-butylbenzene, 3,5 - dimethylbenzylamine, 3-phenylpropylamine, α-amino-n-butylbenzene, 4-methylbenzylamine, 3-methylbenzylamine, 2-methylbenzylamine, N-ethylbenzylamine, N-methylbenzylamine and other aralkylamines containing from 7 to 10 carbon atoms, inclusive; 2-aminopropyl alcohol, 3-amino-n-pentanol, isopropanolamine, 2-amino-n-pentanol-3,3-aminopropyl alcohol, 1-amino-2-butanol, diethanolamine, methylaminoethanol, ethylaminoethanol, isopropylaminoethanol, n-butylaminoethanol, bis-(β-hydroxypropyl)amine, bis(β-hydroxyethyl)amine and other hydroxyalkylamines containing from 2 to 6 carbon atoms, inclusive, and propargylamine. Suitable aliphatic polyamines include ethylenediamine, diethylenetriamine, triethylenetetramine, tetraethylenepentamine, propylenediamine, 3,3'-diaminodipropylamine, 1,3-diaminobutane, unsymm.-diethylethylenediamine, sym.-diethylethylenediamine, hexamethylenediamine, tetramethylenediamine, trimethylenediamine, pentamethylenediamine, 1,2,3-triaminopropane, 1,3-diamino-2-propanol, N-hydroxyethylpropylenediamine, and other aliphatic polyamines containing from 2 to 8 carbon atoms, inclusive, and which may also contain a hydroxyl group. Suitable alicyclic amines are cyclopropylamine, cyclobutylamine, cyclopentylamine, cyclohexylamine, 2 - ethylcyclohexylamine, N - methylcyclohexylamine, N-ethylcyclohexylamine, dicyclohexylamine, 1,2-diaminocyclohexane, 2-aminocyclohexanol, and other primary and secondary amines having from 3 to 6 carbon atoms in the cycloalkyl group and having a total carbon content of from 3 to 12, inclusive, and including hydroxy and amino substituted cycloalkylamines. Suitable non-aromatic heterocyclic amines include ethyleneimine, trimethyleneimine, pyrrolidine, piperidine, 2-methylpyrrolidine, 3-methylpyrrolidine, 3-ethylpiperidine, 2,5-dimethylpyrrolidine, 2,4-dimethylpyrrolidine, 2-methylpiperidine, 3-methylpiperidine, 2,6-dimethylpiperidine, 4-ethylpiperidine, 2-ethylpiperidine, 2,2,4-trimethylpiperidine, piperazine, 5-methyl-2-pyrazoline, trans-2,5-dimethylpiperazine and morpholine. Suitable "aromatic" heterocyclic nitrogen bases are 5 and 6 membered rings containing at least one —$NH_2$ radical and which may also contain from 1 to 2 methyl groups, such as 2-aminopyridine, 6-amino-α-picoline, 5-amino-α-picoline, 3-amino-γ-picoline, 4-aminopyridine, 3,4-diaminopyridine, 4-amino-2,6-dimethylpyridine, 2,4-diaminopyridine, 2,5-diaminopyridine, 2,6-diaminopyridine, 2-aminopyrimidine, 4-aminopyrimidine, 5-amino-3 - methyl - 1,2,4-triazole, 3-amino-1,2,4-triazole, etc. Other basic nitrogen compounds, the residue of which may satisfy the amino group in the above identified formula include hydrazine, methylhydrazine, unsymm.-dimethylhydrazine, ethylhydrazine, phenylhydrazine, allylhydrazine, etc.

The "carboxylic acid salts" are inclusive of alkali and alkaline earth salts such as sodium, potassium, lithium, magnesium, calcium, salts of other metals such as copper, iron, zinc, cobalt, nickel, ammonium and substituted ammonium salts such as salts of methylamine, dimethylamine, trimethylamine, triethylamine, diethylamine, ethanolamine, triethanolamine, diethanolamine, isopropanolamine, triisopropanolamine, 2-(2-hydroxyethyl)aminoethylamine, 2-amino-2-methyl-1-propanol, diisopropylamine, diethylenetriamine, 1,2-propylenediamine, triethylenetetramine, ethylaminoethanol, diethylaminoethanol, diisopropanolamine, ethyl-diethanolamine, 3-aminopropanol, tetramethylammonium hydroxide and tetraethylammonium hydroxide. Other salts include those of long chain alkylamines and alkanolamines containing up to about 20 carbon atoms such as octylamine, dodecylamine, octadecylamine, etc.

The "amides" include not only unsubstituted amides but also those which have mono- or di- substitution on the amide nitrogen with aliphatic radicals such as methyl, 2-hydroxyethyl, 3-hydroxypropyl, isopropyl, tert.-butyl, methallyl, allyl, n-propyl, n-butyl, crotyl propargyl and ethyl.

The term "hydrazide" includes not only unsubstituted hydrazide but also methylhydrazide, unsym.-dimethylhydrazide, diallylhydrazide and phenylhydrazide.

The term "esters" is intended to embrace esters from hydroxy compounds inclusive of substituted and unsubstituted, saturated and unsaturated alcohols, phenols and pyridinols. Hydroxy compounds from which may be prepared esters suitable for use in the present invention include methanol, isopropyl alcohol, sec.-butyl alcohol, ethanol, amyl alcohol, hexanol, octanol, heptanol, lauryl alcohol, tetradecyl alcohol, allyl alcohol, oleyl alcohol, methallyl alcohol, crotyl alcohol, cetyl alcohol, stearyl alcohol, capryl alcohol, polyhydroxy alcohols such as ethylene glycol, polyethylene glycol, trimethylene glycol, ether alcohols of mono- and poly-ethylene and other alkylene glycols marketed under trade names such as Dowanols ® and Cellosolves, aralkyl alcohols such as benzyl and β-phenylethyl alcohol, nitroalcohols such as 2-nitropropanol, 2-nitroethanol, acetylenic alcohols such as propargyl alcohol, 2-methyl-3-butynol-2, 3-methyl-1-pentynol-3, 3-butyne-1-ol, 2-butyne-1,4-diol, 2,4-hexadiyne-1,6-diol, 3,6-dimethyl-4-octyne-3,6-diol, and other hydroxy compounds such as 2,4-dichlorophenoxyethanol, 2,4,5-trichlorophenoxyethanol, 2-(2,4-dichlorophenoxy)propanol, 2-(2,4,5-trichlorophenoxy)propanol, phenol, pentachlorophenol, 4,6-dinitro-o-sec.-amylphenol, 4,6-dinitro-o-sec.-butylphenol, 4,6-dinitro-o-cresol, mono- and polyhalophenols, pyridinols and mono- and polyhalopyridinols. Other preferred esters include glycol esters derived from mono-, di- and polyglycols where the glycol contains from 2 to 3 carbon atoms in each glycol unit, such as propylene glycol, diethylene glycol, dipropylene glycol, polypropylene glycol, etc., mono- and diglycol lower alkyl, phenyl and chlorophenyl ether esters where the glycol is of the ethylene and propylene series and lower alkyl contains from 1 to 4 carbon atoms, inclusive, and chlorophenyl contains from 1 to 3 chlorine atoms, inclusive.

The preferred embodiments of the present invention are (1) methods for the control of plant growth which comprises applying to foliage or plant growth media a growth-controlling dosage of a 4-amino-3,5-dichloropicolinic acid compound; and (2) concentrate compositions suitable for controlling plant growth which comprise a 4-amino-3,5-dichloropicolinic acid compound as active ingredient in intimate admixture with at least one material of the group consisting of finely divided inert solids, surface active dispersing agents, polyglycols, beeswax, paraffin waxes, water, organic solvents, nitrogen fertilizers, phosphate fertilizers, urea-form, urea, meta-phosphates, etc. Especially suitable are materials known as adjuvants in plant growth control art such as wetting agents, spreaders, diluents, emulsifiers, dispersing agents, adhesives and activators. Particularly contemplated as desirable concentrate compositions are those which comprise a 4-amino-3,5-dichloropicolinic acid compound as active ingredient in intimate admixture with at least one material of the group consisting of finely divided inert solids and surface active dispersing agents, the latter including water-dispersible as well as organic solvent emulsifiable agents. Another type of useful concentrate compositions contemplated according to the present invention are aqueous concentrate compositions comprising salts of 4-amino-3,5-dichloropicolinic acid compounds.

The expression "surface active dispersing agent" as herein employed, is intended to include all agents which are capable of acting at the interfacial surface between the picolinic acid compound or composition and water or organic solvent as the dispersion medium, so as to facilitate the dispersion of the 4 - amino - 3,5 - dichloropicolinic acid compound composition in water or solvent. The term is inclusive of solid emulsifying agents such as finely divided aluminum hydroxide and finely divided bentonite, fuller's earth, attapulgite and other clays, as well as liquid and solid ionic and non-ionic wetting and dispersing agents, alkaline earth metal caseinates, alkyl aryl sulfonates, sulfonated oils, complex organic ester derivatives, complex ether alcohols, condensation products of alkylene oxides with phenols and organic acids, polyoxyethylene derivatives of sorbitan esters, mahogany soaps. Other suitable surface active agents may be found in "Detergents and Emulsifiers, Up To Date," written and published by John W. McCutcheon, Inc., New York, 1960.

The term "finely divided insert solids" as herein employed refers to materials whose primary function is not as a dispersant of 4-amino-3,5-dichloropicolinic acid compounds in water or organic solvent but as a carrier for dust compositions. Inclusive of such materials are corn cobs, powdered walnut shells, chalk, talc, gypsum, etc.

According to the present invention, the appropriate 4-amino-3,5-dichloropicolinic acid compound may be compounded with any of the finely divided inert solids to form dust compositions by grinding, mixing or wetting the finely divided carrier with a solution of the picolinic acid compound in a volatile organic solvent. Similiarly, dust compositions containing the 4-amino-3,5-dichloropicolinic acid compound may be compounded from the various of the solid surface active dispersing agents, such as bentonite, fuller's earth, attapulgite and other clays. Depending upon the proportions of ingredients, these dust mixtures may be employed either as treating compositions, or as concentrates and subsequently diluted with additional solid surface active dispersing agent or with talc, chalk, gypsum, etc. to obtain the desired amount of active ingredient in a composition adapted to be applied to plants or plant growth media for the suppression of plant growth. Also, such concentrate dust compositons may be dispersed in water or organic solvent with or without the aid of additional dispersing or emulsifying agent to form spray mixtures. Dust concentrates compounded from liquid 4-amino-3,5-dichloropicolinic acid compounds generally contain from about 1 to about 30 percent by weight of active ingredient, while those compounded from solid 4-amino-3,5-dichloropicolinic acid compounds may contain from about 1 percent to about 95 percent by weight of the active ingredient.

The dust concentrates such as above described or alternately appropriate 4-amino-3,5-dichloropicolinic acid compound may be intimately mixed with liquid or solid ionic or non-ionic dispersing agents to form spray concentrates. Such concentrates are readily dispersible in liquid carriers to form sprays containing the picolinic acid compound in any desired amount.

The 4-amino-3,5-dichloropicolinic acid compounds may be compounded with suitable water-miscible or water-immiscible organic liquids and surface active dispersing agents to produce liquid concentrates which may be further formulated with water and/or oil to prepare spray mixtures in the form of aqueous dispersions or oil-in-water emulsion compositions. The exact steps to be employed in preparing the compositions is within the knowledge of those skilled in the art. Preferred water-immiscible organic liquids include petroleum oil and distillates, toluene, xylene, cumene and other aromatic hydrocarbon solvents, isoparaffin oil and other hydrocarbon solvents. Water-miscible organic solvents include acetone, methyl ethyl ketone, cyclohexanone, dimethylformamide, alcohols, ether alcohols of ethylene glycol marketed under trade names such as Dowanol® and Cellosolve, esters such as ethyl acetate and isopropyl acetate. When the 4-amino-3,5-dichloropicolinic acid compounds are water-dispersible salts, aqueous compositions are readily prepared. The salts may be first compounded in a water-miscible organic solvent and added to a minimal amount of water or may be directly compounded in water or may by compounded in a water-organic solvent mixture. Usually, the use of a procedure which includes addition of a small amount of a water-miscible organic solvent is preferred. Moreover, in the case of salt compositions, the salt need not be preformed but may be prepared during the compounding process. Thus, the desired 4-amino-3,5-dichloropicolinic acid compound and desired amine or inorganic base may be mixed together in appropriate amounts in an aqueous organic solvent mixture. Suitable concentrate compositions of salts generally contain from about 5 to about 95 percent by weight of the 4-amino-3,5-dichloropicolinic acid compound salt.

In the emulsifiable concentrates and other concentrate compositions described above, the 4-amino-3,5-dichloropicolinic acid compounds preferably constitutes from about 5 to 95 percent by weight of the composition.

In a further embodiment, the 4-amino-3,5-dichloropicolinic acid compound compositions may contain other plant growth modifying agents either as adjuvants or supplementary materials for both terrestrial and aquatic applications. Representative plant growth modifying agents include 2-chloro-4,6-bis(ethylamino)-s-triazine; 2-chloro-4-ethylamino-6-isopropylamino - s - triazine; 2-methoxy-4,6-bis(isopropylamino)-s-triazine; 3-(p-chlorophenyl)-1,1-dimethylurea; 3-(p-chlorophenyl)1,1-dimethylurea acetate; 3-phenyl-1,1-dimethylurea; 3-phenyl-1,1-dimethylurea trichloroacetate; 2,4-dichlorophenoxyacetic acid, its salts and esters; 2,4,5-trichlorophenoxyacetic acid, its salts and esters; 2-methyl-4-chlorophenoxyacetic acid, its salts and esters; 2-(2,4,5-trichlorophenoxy)propionic acid, its salts and esters; propylethyl-n-butylthiol carbamate; isopropyl N-(3-chlorophenyl)carbamate; cis and trans 2,3-dichloroallyl-diisopropyl thiocarbamate; ethyl di-n-propylthiocarbamate; 4-chloro-2-butynyl N-(3-chlorophenyl)carbamate; 2,3,6-trichlorobenzoic acid, its salts and esters; 2,3,5,6-tetrachlorobenzoic acid, its salts and esters; 2-methoxy-3,6-dichlorobenzoic acid, its salts and esters; 2,2-dichloropropionic acid, its salts and esters; trichloroacetic acid, its salts and esters; 4,6-dinitro-s-sec.-butylphenol; 3,5-dinitro-o-cresol; pentachlorophenol; 5-bromo-3-isopropyl-6-methyluracil; sodium arsenite; dimethylarsenic acid; tricalcium arsenate; sodium chlorate; sodium borates; 3,6-endoxohexahydrophthalic acid; O-(2,4-dichlorophenyl)-O-methyl isopropylphosphoroamidothioate; 3,4-dichloropropionanilide; 1,2-dihydroxypyridazine-3,6-dione; 3-amino-1,2,4-triazole; 2,3,6-trichlorophenylacetic acid, its salts and esters; 1,1'-ethylene-2,2'-dipyridylium dibromide; 2,6-dinitro-N,N-di-n-propyl-2,2,2-trifluoro-p-toluidine; α-chloro-N-diallylacetamide; herbicidal oils; and other inorganic salts and aliphatic, aromatic and heterocyclic organic compounds.

In carrying out the methods of the present invention, the 4-amino-3,5-dichloropicolinic acid compound or compositions thereof are administered to foliage, plant parts or masses, or growth media of the plant species whose control is desired. The exact amount to be administered varies with the particular type of growth control to be achieved. It further varies with the method of application, i.e., whether the application is to be made to foliage, or fruit or flower or particular plant part, or to soil, water or other growth medium, and the overall locus of application, i.e., on the one hand, a sheltered area such as greenhouse, sheltered plots or ponds, or standing water, and on the other hand, an exposed area such as fields, railroad right-of-ways, lakes or moving bodies of water such as canals. Thus, for example, in the treatment of grass weeds, soil application is preferred to foliage application and the amounts are governed thereby. Also, weeds present in sheltered areas are more responsive to treatment and minimal dosages are usually adequate whereas field applications oftentimes require higher dosages to counteract adverse weather effects. An additional factor to be considered is the plant species to be treated, as well as the presence or absence of desirable plants together with the undesirable species. Thus, selective broadleaf control may be achieved by administration of sufficient 4-amino-3,5-dichloropicolinic acid compound to eradicate broadleafs without affecting grasses.

Effective control of terrestrial plants in soil may be achieved by the administration of as little as 0.1 p.p.m. (part by weight per million parts by weight of soil). Except where selective growth control is sought, the upper limit is primarily a matter of economic practicability. Usually, it is of no advantage to apply more than about 80 pounds per acre. Such administration provides a concentration of about 200 p.p.m. of picolinic acid compound distributed throughout 0.1 acre foot. In general, it has been found where dangers from weathering and reinfestation are secondary, good results may be obtained by the application of from about 0.25 pound per acre to about 10 pounds per acre. Under field conditions, the preferred range is from about 0.5 pound per acre to about 25 pounds per acre. Where administration is to be carried out providing for selective control of broadleafs, the desired range is from about 1 p.p.m. to about 25 p.p.m. while the desired range for grass control is from about 30 p.p.m. to about 200 p.p.m. distributed throughout 0.1 acre foot. In foliar applications, it is preferred that the foliage of plants be contacted with compositions containing from about 0.25 ounce of 4-amino-3,5-dichloropicolinic acid compound to about 16 pounds per 100 gallons of spray composition.

In general, good controls of aquatic plants are obtained when the 4-amino-3,5-dichloropicolinic acid compounds are supplied in the water surrounding the plants in an amount of from about 10 to 1000 parts or more by weight per million parts by weight of the environing aqueous medium. The exact dosage to be employed is dependent upon the plant mass to be treated and whether or not the exposure is carried out in a moving stream such as a canal or in standing water such as a pond. In standing water, good results are obtained when using minimal dosages of the compounds. In moving streams, somewhat higher concentrations are required in order to provide for the contacting of the aquatic vegetation with a growth controlling amount of the 4-amino-3,5-dichloropicolinic acid compound.

The administration of 4-amino-3,5-dichloropicolinic acid compounds or compositions thereof to plants or plant growth media may be carried out in any manner known to the skilled in the art and may be carried out by using dusts, sprays or any other modifications provided that an effective dosage is supplied. When the application is to be made by employing spray compositions, the concentration of the 4-amino-3,5-dichloropicolinic acid compound in the spray composition generally runs from about 0.1 to about 50 percent by weight or higher. In dust compositions, the concentration of the active ingredient may be from about 1 to about 95 percent by weight. The total volume or weight of the treating compositions to be employed is not critical as long as the critical amounts of the 4-amino-3,5-dichloropicolinic acid compound are supplied as previously set forth. Frequently, the desirability of a more concentrated or dilute composition depends on the method of application and area to be covered; hence, the selection of concentration and total volume or weight may readily be made by the skilled in the art from the foregoing teachings.

The new dust and spray compositions may be applied to foliage or soil by conventional methods. Thus, application may be made with power dusters, boom and hand sprayers and spray dusters or from planes. For soil application, the modified or unmodified compositions may be mechanically mixed with the soil, applied to the surface of soil and thereafter dragged or disced into the soil to a desired depth, or transported into the soil with a liquid carrier such as by injection, spraying or irrigation.

Although the conventional spraying and dusting methods are the preferred methods for carrying out the present invention in terrestrial plant growth control, it is not to be construed as being limited thereto. Thus, any method for administration of an effective dosage to soil or to the aerial portions of the plants and compositions for accomplishing these purposes employing 4-amino-3,5-dichloropicolinic acid compound is considered to be embraced by the present invention. The invention is intended to embrace compositions and methods which utilize invert emulsions, wax bars, prills, granules, etc. The invention is also intended to embrace the use of 4-amino-3,5-dichloropicolinic acid compound in connection with or as adjunct to other herbicidal materials. Compositions and methods which employ the 4-amino-3,5-dichloropicolinic acid compound in conjunction with fungicidal or insecticidal material to accomplish multiple pest control objectives is also contemplated. Similarly, the 4-amino-3,5-dichloropicolinic acid compounds used as herbicides may be added to soil with fertilizers so that the soil may be denuded of undesirable plants and be simultaneously put into readiness for the following growing season.

For aquatic vegetation control, a growth inhibiting amount of a 4-amino-3,5-dichloropicolinic acid compound is dispersed in the water adjacent to and surrounding the submerged portions of the plants in a pond, lake, river, canal, stream, ditch or other water courses. This is readily accomplished by introducing the compounds or a composition containing the compounds into water above a plant mass so as to permit its dispersion in the water adjacent the growing plants. The introduction of the active materials into the water environing aquatic weeds may be accomplished by spraying or sprinkling the compositions onto or beneath the surface of the water or by metering the compositions into the vortex of a rapidly turning propellor to obtain maximum distribution of the compound in the water. In moving water courses, the water flow may be employed to distribute the 4-amino-3,5-dichloropicolinic acid compounds. Thus, the compounds may be introduced into the water in such a way that they are distributed into and over the plant growth area for a sufficient time of exposure to kill the plants.

The following examples illustrate the invention but are not to be construed as limiting:

*Example 1*

0.43 gram of 4-amino-3,5-dichloropicolinic acid was neutralized with sodium bicarbonate and the resulting solution extended to 24 milliliters to produce a composition containing about 18 milligrams acid equivalent of sodium 4-amino-3,5-dichloropicolinate per milliliter. This composition was applied with water as a drench to pots containing sandy soil at a rate of 36 pounds per acre (90 parts by weight per million parts by weight of soil). The treated pots as well as pots containing sandy soil drenched with unmodified water as checks were planted with seeds of twelve plant species. Twenty-one days after planting the treated and untreated pots were examined to determine the extent of control as indicated by germination of seeds and growth of plants. The results are set forth in Table I.

TABLE I

| Plant Species | Percent Growth Control | |
|---|---|---|
| | Sodium 4-amino-3,5-dichloropicolinate | Check |
| Cotton | *100 | 0 |
| Watergrass | 100 | 0 |
| Bush beans | 100 | 0 |
| Oats | 100 | 0 |
| Peas | 100 | 0 |
| Corn | 100 | 0 |
| Cucumber | 100 | 0 |
| Wheat | 100 | 0 |
| Tomato | 100 | 0 |
| Cabbage | 100 | 0 |
| Flax | 100 | 0 |

*100% control indicates complete absence of germination and growth.

Example 2

In a similar operation, a composition containing 18 milligrams acid equivalent of sodium 4-amino-3,5-dichloropicolinate per milliliter and prepared as above described was suitably diluted and applied as drench to pots at lower rates than that employed in Example 1. The pots so treated as well as check pots were then seeded with bush beans, peas, tomatoes and flax. Twenty-one days after seeding, the pots were examined; the results are set forth in Table II.

TABLE II

|  | Percent Growth Control |  |  |  |  |  |
| --- | --- | --- | --- | --- | --- | --- |
|  | Lbs./acre |  |  |  |  |  |
|  | 18 | 4½ | 1⅛ | 9/16 | 9/64 | 0 |
| P.p.m. | 45 | 11.2 | 2.8 | 1.4 | 0.35 | Check |
| Plant Species: |  |  |  |  |  |  |
| Bush beans | 100 | 100 | 100 | 100 | 100 | 0 |
| Peas | 100 | 100 | 100 | 100 | 100 | 0 |
| Tomatoes | 100 | 100 | 100 | 100 | 100 | 0 |
| Flax | 100 | 100 | 100 | 100 | 100 | 0 |

Example 3

In operations carried out in a manner similar to that above described, 3,5-dichloro-4-methylaminopicolinic acid and methyl 3,5-dichloro-4-methylaminopicolinate were applied as soil drench to pots containing sandy soil at a rate of 40 pounds per acre. The pots were then planted to radish, cucumber and crab grass seeds. After 13 days, the pots were examined to determine the effect on emergent plants and compared with check operations where the seeds were planted in untreated soil. It was found that there was 100% control or complete absence of emergent plants from seeds which had been planted in soil treated with either 3,5-dichloro-4-dimethylaminopicolinic acid or methyl 3,5-dichloro-4-methylaminopicolinate in contrast to good emergence of plants from seeds planted in untreated check soil.

Example 4

A similar operation was carried out except that the effect of decreasing dosage rates of the 4-amino-3,5-dichloropicolinic acid compounds were determined. The determinations were made on cucumber seeds; the results obtained are set forth in Table III.

TABLE III

|  | Percent Control |  |  |  |  |
| --- | --- | --- | --- | --- | --- |
|  | Rate of Application in pounds/acre |  |  |  |  |
|  | 40 | 20 | 10 | 5 | 2½ |
| 3,5-Dichloro-4-dimethylaminopicolinic acid | 100 | 100 | 100 | 100 | 100 |
| Methyl 3,5-dichloro-4-methylaminopicolinate | 100 | 100 | 100 | 100 | 100 |

In check operations, there were complete emergence of cucumber plants from the planted cucumber seeds.

Example 5

In operations carried out in the manner above described, the effect of 4-amino-3,5-dichloropicolinic acid compounds on different plant species at different rates are determined. The results are set forth in Table IV.

TABLE IV

| Picolinic Acid Compound | Rate, lbs./acre | Percent Control | | |
| --- | --- | --- | --- | --- |
|  |  | Cucumbers | Brome Grass | Tomatoes |
| Ethyl 4-amino-3,5-dichloropicolinate | 40 | 100 | 100 | 100 |
|  | 20 | 100 | 100 | 100 |
|  | 10 | 100 | 100 | 100 |
|  | 5 | 100 | 100 | 100 |
| Isopropyl 4-amino-3,5-dichloripicolinate | 40 | 100 | 100 | 100 |
|  | 20 | 100 | 100 | 100 |
|  | 10 | 100 | 100 | 100 |
|  | 5 | 100 | 100 | 100 |
| Methyl 3,5-dichloro-4-dimethylaminopicolinate | 40 | 100 | 100 | 100 |
|  | 20 | 100 | 100 | 100 |
|  | 10 | 100 | 100 | 100 |
|  | 5 | 100 | 100 | 100 |
| 4-Amino-3,5-dichloropicolinamide | 40 | 100 | 100 | 100 |
|  | 20 | 100 | 100 | 100 |
|  | 10 | 100 | 100 | 100 |
|  | 5 | 100 | 100 | 100 |
| 2-Hydroxyethyl 4-amino-3,5-dichloropicolinate | 40 | 100 | 100 | 100 |
|  | 20 | 100 | 100 | 100 |
|  | 10 | 100 | 100 | 100 |
|  | 5 | 100 | 100 | 100 |
| Check |  | 0 | 0 | 0 |

Example 6

In a similar operation, 4-amino-3,5-dichloropicolinic acid hydrazide was administered to soil at a rate of 40 pounds per acre, and thereafter planted with cabbage, brome grass and cucumber seeds. In simultaneous operations, untreated soil was also planted to these seeds. Twelve days after planting, treated and untreated soil were examined to determine the germination and growth of planted seeds. It was found that there was complete control of germination and growth of the seeds of cabbage, brome grass and cucumber which were planted in soil treated with 4-amino-3,5-dichloropicolinic acid hydrazide whereas there was good germination and growth from seeds planted in untreated soil.

Example 7

80 milligrams of 3,5-dichloro-4-methylaminopicolinic acid was dissolved in 2 milliliters of acetone containing 4 percent by volume of Protox 7200 (a commercial nonionic emulsifier). The concentrate composition was dispersed in water as previously described and applied with additional water as drench to sandy soil at various dosage rates. The various treated soils as well as untreated soils were then planted with cucumber seeds and then observed after two weeks to determine the germination and growth of cucumber plants from the soil. The results are set forth in Table V.

TABLE V

| Rate, lbs./acre: | Percent control |
| --- | --- |
| 40 | 100 |
| 20 | 100 |
| 10 | 100 |
| 5 | 100 |
| 2.5 | 100 |
| 1.25 | 100 |
| 0 (Check) | 0 |

Example 8

In a similar operation, 4-amino-3,5-dichloropicolinamide was administered to soil at rates ranging from 40 pounds per acre to 5/64 pound per acre, and the treated as well as untreated soil thereafter planted to cucumber seeds. Examination after 15 days revealed that effective control of germination and growth of cucumber seeds was obtained even at 5/64 pound per acre whereas no control but good germination and growth was obtained in the untreated soil.

Example 9

In similar operations, 4-amino-3,5-dichloro-N-(2-hydroxy-ethyl)picolinaminde, 4-amino-3,5-dichloro-N,N-bis(2-hydroxyethyl)-picolinamide and 4-amino-3,5-dichloro-N-octylpicolinaminde were administered to soil plots at a rate of 40 pounds per acre. The treated as well as untreated plots were then planted with turnip, brome grass and cucumber seeds. One week after planting observations were made to determine the control of germination and growth of the planted seeds. The results are set forth in Table VI.

TABLE VI

|  | Percent Control | | |
|---|---|---|---|
|  | Turnip | Brome Grass | Cucumbers |
| 4-Amino-3,5-dichloro-N-(2-hydroxyethyl)-picolinamide | 100 | 100 | 100 |
| 4-Amino-3,5-dichloro-N,N-bis(2-hydroxyethyl)picolinamide | 100 | 100 | 100 |
| 4-Amino-3,5-dichloro-N-octylpicolinamide | 99 | 100 | 100 |
| Check | 0 | 0 | 0 |

Example 10

In similar operations, the aqueous dispersions containing the following compounds are applied to plots of sandy loam soil at a rate of 40 pounds per acre: n-hexadecyl 4-amino-3,5-dichloropicolinate, n-octyl 3,5-dichloro-4-(2-hydroxyethyl)aminopicolinate, 4-(sec.-butyl-amino) - 3,5-dichloropicolinic acid methylhydrazide, oleyl 4-amino-3,5-dichloropicolinate, 2-butoxyethyl 3,5-dichloro-4-(2-hydroxyethyl)-aminopicolinate, and tetramethylammonium 4-amino-3,5-dichloropicolinate. The treated as well as untreated plots are then seeded with cucumber seeds. After 28 days, the plots are examined to determine the extent of germination and growth of cucumber plants. It is found that there is complete absence of growth of cucumber plants in the treated plots whereas in the untreated plots there is good growth of cucumber plants.

Example 11

In separate operations, 28.8 milligrams of a 4-amino-3,5-dichloropicolinic acid compound was dissolved in 0.5 milliliter of acetone and a drop of Protox 7200 added thereto. The concentrate compositions thus prepared were diluted with sufficient amounts of water containing 1 milliliter of wetting agent per liter to produce treating compositions containing 4 pounds of 4-amino-3,5-dichloropicolinic acid compound per 100 gallons of spray solution. The compositions were then applied to foliage of young cucumber plants. Twenty-seven days after application, the plants were examined and compared with untreated check plants. The results are set forth in Table VII.

TABLE VII

| 4-amino-3,5-dichloropicolinic acid compound: | Percent control[1] |
|---|---|
| 2-hydroxyethyl 4-amino-3,5-dichloropicolinate | 100 |
| 4-amino-3,5-dichloro-N-(2-hydroxyethyl)picolinamide | 100 |
| 4-amino-3,5-dichloro-N,N-bis-(2-hydroxyethyl)picolinamide | 100 |
| 4-amino-3,5-dichloro-N-octyl-picolinamide | 100 |
| 4-amino-3,5-dichloropicolinic acid, hydrazide | 100 |
| Triethylammonium 4-amino-3,5-dichloropicolinate | 100 |

[1] 100 percent control indicates plants dead or moribund.

Example 12

In similar operations, 40 milligrams of each of several 4-amino-3,5-dichloropicolinic acid compounds were dissolved in 2 milliliters of acetone and emulsifier added thereto. In the case of 4-amino-3,5-chloropicolinic acid itself, the acid was nutralized with aqueous sodium bicarbonate as described in Example 1. The concentrate compositions thus prepared were diluted with water to prepare treating compositions containing 4 pounds of a 4-amino-3,5-dichloropicolinic acid compound per 100 gallons of spray solution. The compositions were then applied to foliage of locust plants. Five days after application, the plants were examined and compared with untreated check plants. The results are set forth in Table VIII.

TABLE VIII

| 4-amino-3,5-dichloropicolinic acid compound: | Percent control,[1] five days |
|---|---|
| Sodium 4-amino-3,5-dichloropicolinate | 100 |
| Methyl-4-amino-3,5-dichloropicolinate | 100 |
| Ethyl 4-amino-3,5-dichloro picolinate | 100 |
| Isopropyl 4-amino-3,5-dichloropicolinate | 100 |
| 2-Hydroxyethyl 4-amino-3,5-dichloropicolinate | 100 |

[1] Plants dead.

Example 13

In operations similar to that described in Examples 11 and 12, concentrate compositions of sodium 4-amino-3,5 - dichloropicolinate and methyl 4 - amino-3,5-dichloropicolinate were prepared. The compositions were then diluted to produce a series of treating compositions containing varying concentrations of the 4 - amino-3,5 - dichloropicolinic acid compound. These compositions were applied as a fine spray to foliage of young tomato plants. Twenty-five days after application, the plants were examined and compared with untreated check plants to determine the effectiveness of the compositions for plant growth control. The results are set forth in Table IX.

TABLE IX

| Rate of Application in lbs./100 gals. | Sodium 4-amino-3,5-dichloropicolinate | Methyl 4-amino-3,5-dichloropicolinate |
|---|---|---|
| 4 | Dead | Dead. |
| 1 | do | Do. |
| ¼ | do | Do. |
| ⅛ | do | Do. |
| 1/64 | (*) | Do. |

*Stem swollen plant severely twisted.

Example 14

Aqueous dispersions of sodium 4-amino-3,5-dichloropicolinate at varying concentrations were prepared as previously described. The compositions were applied as drench at rates of 40, 20, 10 and 5 pounds per acre. The treated as well as untreated soil were planted to cucumbers and maintained in the greenhouse. Every 7 days, the germination and growth of plants were observed and compared with check plants. After grading, the plants were pulled out and the soil fallowed with only light daily watering. After 30 days, the soil was reseeded and the process repeated. It was found that the soil treated with 4-amino-3,5-dichloropicolinic acid, after six months gave substantially complete growth control of planted cucumber seeds.

Example 15

Concentrate compositions are prepared as follows:

(A) 25 parts by weight of 3-hydroxypropyl 3,5-dichloro-4-isopropylaminopicolinate, 65 parts by weight of attapulgite clay, 2 parts by weight of Daxad (polymerized sodium salt of alkyl aryl and aryl alkyl sulfonic acid) and 8 parts by weight of Acto 700 (an alkyl aryl sulfonate) are blended and hammermilled together to produce a water-dispersible mixture.

(B) 25 parts by weight of sec.-amyl 3,5-dichloro-4-diethylaminopicolinate, 65 parts of xylene and 10 parts of Triton X–100 (an alkylated aryl polyether alcohol) are mechanically mixed together to produce an emulsifiable liquid composition.

(C) 13.3 parts by weight of methyl 4-amino-3,5-dichloropicolinate, 20.8 parts by weight of dimethyl sulfoxide, 61.5 parts by weight of Protox 7400 (a nonionic anionic blend of surface active agent) were mixed together to produce an emulsifiable mixture.

(D) 25 parts by weight of 4-amino-3,5-dichloropicolinic acid phenylhydrazide, 71 parts by weight of attapulgite clay, 2 parts by weight of Nacconol NR (sodium alkyl aryl sulfonate) and 2 parts by weight of Daxad are blended and hammermilled together to produce a water dispersible composition.

(E) 10 parts by weight of 4-amino-3,5-dichloropicolinic acid phenylhydrazide and 90 parts by weight of attapulgite clay are blended and hammermilled together to produce a dust composition.

(F) 12 parts by weight of 4-amino-3,5-dichloropicolinic acid, 8 parts by weight of triethylamine, 10 parts by weight of isopropyl alcohol and 70 parts by weight of water are mechanically mixde together to produce an aqueous composition.

(G) 5 parts by weight of 4-amino-3,5-dichloropicolinic acid is dissolved in methylene chloride and sprayed onto 95 parts by weight of 8/15 mesh granular attaclay to produce a granular composition.

(H) 5 parts by weight of 4-amino-3,5-dichloropicolinic acid is dissolved in 95 parts by weight of fertilizer grade urea, heated just to melting and the molten composition ejected from a heated nozzle into a cooling tower to produce a herbicidal urea prill.

(I) 10 parts by weight of 3,5-dichloro-4-methylaminopicolinic acid and 90 parts by weight of powdered walnut shells are blended and hammermilled together to produce a dust composition.

*Example 16*

0.005 part by weight of 4-amino-3,5-dichloropicolinic acid, 10 parts of an acetone solution containing 0.1 percent by weight of a dimeric alkylated aryl polyether alcohol (Triton X–155) and 90 parts of water are mixed together to provide a liquid water dispersible concentrate.

In a further operation, 50 parts by weight of sodium 4-amino-3,5-dichloropicolinate and 5 parts by weight of Triton X–155 are mixed together to provide a water-dispersible composition.

In a similar manner, 25 parts by weight of methyl 3,5-dichloro-4-methylaminopicolinate, 10 parts by weight of Triton X–155 and 65 parts of xylene are mechanically mixed and ground together to provide an emulsifiable concentrate composition.

In still another operation, 0.005 part by weight of methyl 3,5-dichloro-4-methylaminopicolinate, 10 parts of an acetone solution containing 0.1 percent by weight of Triton X–155 and 90 parts of water are mixed together to provide a liquid water dispersible concentrate.

In separate operations, the concentrate compositions are dispersed in water in separate tanks to provide aqueous media containing one of the 4-amino-3,5-dichloropicolinic acid compounds at a concentration of about 100 parts by weight per million parts of water. Aquatic plants, *Cabomba carolinana* (Cabomba), *Salvinia rotundifolia* (Salvinia), *Ceratophyllum spp.* (coontail), *Lysimastrum nummularia* (moneywort) and *Elodea spp.* (water weed) are placed in the tanks and exposed to the aqueous compositions. In other tanks are placed the named plant species in untreated water to serve as checks. At regular intervals, observations are carried out to ascertain what controls of growth have been obtained. About three weeks after initiating the treating operations, observations show good controls of the growth of the plants in the treated tanks whereas the check tanks are found to support luxurious and succulent growth of the named plant species.

*Example 17*

In separate operations carried out in a similar manner, sodium 4-amino-3,5-dichloropicolinate and methyl 4-methylamino-3,5-dichloropicolinate are separately applied to tanks in which are growing Ceratophyllum spp. (coontail) at a rate sufficient to provide a concentration in the tanks of 10 parts by weight per million of aqueous medium. Check tanks, also containing coontail are left untreated. Observations made after about 14 days shown 100 percent kill of the plant in the tanks containing a 4-amino-3,5-dichloropicolinic acid compound whereas the plants in the check tanks are growing profusely.

*Example 18*

In a manner similar to that described in Examples 1–10, aqueous dispersions were prepared for each of 4-amino-3,5-dichloropicolinic acid, methyl 4-amino-3,5-dichloropicolinate, octadecylammonium 4-amino-3,5-dichloropicolinate, triethylammonium 4-amino-3,5-dichloropicolinate, tris (2-hydroxypropyl)ammonium 4-amino-3,5-dichloropicolinate and potassium 4-amino-3,5-dichloropicolinate as follows: Concentrate compositions of 4-amino-3,5-dichloropicolinic acid compounds were first prepared by mixing to a uniform composition the appropriate 4-amino-3,5-dichloropicolinic acid compound and a water-soluble solvent. The concentrate compositions were then uniformly dispersed in water to obtain treating compositions applicable as drench to sandy loam soil.

In separate operations, each treating composition was uniformly applied to different seed beds seeded to sugar beet plants as a drench at a rate of 2.5 pounds per acre. As a check operation, an aqueous dispersing medium containing no 4-amino-3,5-dichloropicolinic acid compound was uniformly applied to seed beds which had also been seeded to sugar beet. The plants were allowed to germinate and grow in the greenhouse for about 18 days and thereafter examined and compared with the check to determine the extent of germination and growth of the plants. The results obtained are set forth in the table below. In the table, the expression "Control" designates from 90% to 100% inhibition of germination or growth. The expression "No Control" designates no inhibition of germination and growth but instead good growth of healty plants.

| Compound: | Results, sugar beet |
|---|---|
| 4-amino-3,5-dichloropicolinic acid | Control |
| Methyl 4-amino-3,5-dichloropicolinate | Control |
| Octadecylammonium 4-amino-3,5-dichloropicolinate | Control |
| Triethylammonium 4-amino-3,5-dichloropicolinate | Control |
| Tris(2-hydroxypropyl)ammonium 4-amino-3,5-dichloropicolinate | Control |
| Potassium 4-amino-3,5-dichloropicolinate | Control |
| Check | No control |

The 4-amino-3,5-dichloropicolinic acid compounds of the present invention which are free acids may be prepared by reacting an appropriate amine and 3,4,5-trichloro-2-(trichloromethyl)pyridine at temperatures of from 15° to about 100° C. at atmospheric pressure or autogenerous pressure, if pressure reactor is used, to obtain 4-amino-3,5-dichloro-2-(trichloromethyl)pyridine intermediate. The latter is recovered as solid or oily residue by washing the reaction mixture with water. The 4-amino-3,5-dichloro-2-(trichloromethyl)pyridine is then mixed with aqueous acid and the resulting mixture heated to about 80° C. to 160° C. for about 1 to 2 hours and the mixture poured into water to precipitate the 4-amino-3,5-dichloropicolinic acid compound. The latter is recovered by conventional procedures. The 4-amino-3,5-dichloropicolinc acid compounds which are salts may be prepared by mixing together substantially equivalent proportions of the acid and appropriate base in aqueous medium and evaporating to dryness. Salts derived from metals whose hydroxides are difficultly soluble in water may be prepared by reacting the sodium salt of 4-amino-3,5-dichloropicolinic acid prepared as above described with the chloride or nitrate of the appropriate metal in a metathetical reaction. The esters may be prepared by heating the appropriate 4-amino-3,5-dichloropicolinic acid with thionyl chloride to produce the intermediate 4-amino-3,5-dichloropicolinyl chloride and thereafter heating the acid chloride thus obtained with the appropriate hydroxy compound in pyridine for from 0.5 to 2 hours to produce the desired ester compound. The 4-amino-3,5-dichloropicolinic acid compounds which are amides or hydrazides may be prepared by mixing together and reacting a lower alkyl ester thereof prepared as above described with an appropriate nitrogen base at temperatures of from 15° C. to about 100° C. at pressures ranging from atmospheric pressure to autogeneous pressure of a closed system for from several minutes to several hours. At the end of this period, the mixture is poured into water to obtain the desired amide or hydrazide which is then recovered by conventional procedures.

The preferred compounds for use in the methods and compositions of the present invention may be represented by the structure wherein R' and R" are independently

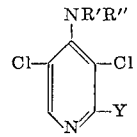

selected from the group consisting of hydrogen, lower alkyl and lower hydroxyalkyl; Y is a carboxylic acid derived group selected from the group consisting of carboxylic acid represented by the formula —COOH; carboxylic acid salt represented by the formula —COOM wherein M is selected from the group consisting of alkali metals, alkaline earth metals, copper, iron, zinc, cobalt, nickel ammonium and substituted ammonium wherein said substituted ammonium contains at least one substituent selected from the group consisting of alkyl, hydroxy substituted alkyl and amino substituted alkyl; carboxylic acid amide represented by a formula selected from the group consisting of —CONH$_2$, —CONHR$_1$ and CONR$_1$R$_2$ wherein R$_1$ and R$_2$ are independently selected from the group consisting of alkyl, hydroxyalkyl, alkenyl and alkynyl; carboxylic acid hydrazide represented by a formula selected from the group consisting of —CONHNH$_2$ and —CONHNHR$_3$ wherein R$_3$ is selected from the group consisting of methyl, ethyl, allyl and phenyl; and carboxylic acid ester represented by the formula —COOR wherein R is selected from the group consisting of alkyl, alkenyl, alkoxyalkyl and hydroxyalkyl.

Particularly useful are compounds in which Y in the above formula is substituted with Y' wherein Y' is represented by —COOH; —COOM' wherein M' is alkali metal, ammonium or mono- or di- alkyl or hydroxyalkyl substituted ammonium wherein the total carbon content of the substituent on the ammonium nitrogen is from 1 to 18 carbon atoms, inclusive; —COONH$_2$, —CONHR$_5$ or CONR$_5$R$_6$ wherein R$_5$ and R$_6$ are independently selected from the group consisting of alkyl, hydroxyalkyl, alkenyl and alkynyl wherein the total carbon content of the substituents on the amido nitrogen is from 1 to 8 carbon atoms, inclusive; —CONHNH$_2$ and —CONHNHR$_7$ wherein R$_7$ is selected from the group consisting of methyl, ethyl, allyl and phenyl; and —COOR$_4$ wherein R$_4$ is selected from the group consisting of alkyl containing from 1 to 18 carbon atoms, inclusive, alkenyl containing from 3 to 18 carbon atoms, inclusive, lower alkoxyalkyl and lower hydroxyalkyl containing from 2 to 10 carbon atoms, inclusive. Especially desirable are the compounds in which Y is represented by Y' and R' and R" are substituted with R''' and R'''' wherein R''' and R'''' are independently selected from the group consisting of hydrogen, alkyl and hydroxyalkyl containing from 1 to 3 carbon atoms, inclusive. Especially preferred are alkali metal salts, ammonium and lower alkyl and lower hydroxyalkyl ammonium salts containing not more than about 10 carbon atoms in the salt substituent.

We claim:

1. A method for controlling the growth of vegetation which comprises applying to the area where control of said vegetative growth is desired, a growth controlling amount of a 4-amino-3,5-dichloropicolinic acid compound having the formula

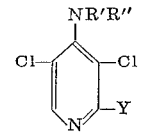

wherein R' and R" are independently selected from the group consisting of hydrogen, lower alkyl containing from 1 to 3 carbon atoms, inclusive, and lower hydroxyalkyl containing from 1 to 3 carbon atoms, inclusive; Y is a carboxylic acid derived group selected from the group consisting of carboxylic acid represented by the formula —COOH; carboxylic acid salt represented by the formula —COOM wherein M is selected from the group consisting of alkali metals, alkaline earth metals, copper, iron, zinc, cobalt, nickel, ammonium and substituted ammonium wherein said substituted ammonium contains at least one substituent selected from the group consisting of alkyl, hydroxyalkyl and amino substituted alkyl, said alkyl containing from 1 to 20 carbon atoms, inclusive, said hydroxyalkyl containing from 2 to 20 carbon atoms, inclusive, and said amino substituted alkyl containing from 3 to 6 carbon atoms, inclusive; carboxylic acid amide represented by a formula selected from the group consisting of —CONH$_2$, —CONHR$_1$, and —CONR$_1$R$_2$ wherein R$_1$ and R$_2$ are independently selected from the group consisting of alkyl, hydroxyalkyl, alkenyl and alkynyl where the total carbon content of the substituents on the amido nitrogen is from 1 to 8 carbon atoms, inclusive; carboxylic acid hydrazide represented by a formula selected from the group consisting of —CONHNH$_2$ and —CONHNHR$_3$ wherein R$_3$ is selected from the group consisting of methyl, ethyl, allyl and phenyl; and carboxylic acid ester represented by the formula —COOR wherein R is selected from the group consisting of alkyl containing from 1 to 18 carbon atoms, inclusive, alkenyl containing from 3 to 18 carbon atoms, inclusive, lower hydroxyalkyl containing from 2 to 10 carbon atoms, inclusive, and lower alkoxyalkyl containing from 2 to 10 carbon atoms, inclusive.

2. A method according to claim 1 wherein the 4-amino-3,5-dichloropicolinic acid compound is applied to soil in an amount of at least 0.1 part by weight per million parts by weight of soil.

3. A method according to claim 1 wherein the 4-amino-3,5-dichloropicolinic acid compound is applied to aquatic growth medium in an amount of at least 10 parts by weight per million parts by weight of the environing aqueous medium.

4. A method according to claim 1 wherein the 4-amino-3,5-dichloropicolinic acid compound is applied to the aerial portion of plants in a composition containing at least 0.1 percent by weight of the 4-amino-3,5-dichloropicolinic acid compound.

5. A plant growth control concentrate composition which comprises a growth controlling amount of a 4- amino-3,5-dichloropicolinic acid compound as active ingredient in intimate admixture with a finely divided inert solid and a surface active dispersing agent, wherein said 4-amino-3,5-dichloropicolinic acid compound has the formula

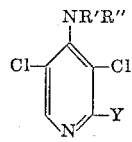

wherein R' and R" are independently selected from the group consisting of hydrogen, lower alkyl containing from 1 to 3 carbon atoms, inclusive, and lower hydroxyalkyl containing from 1 to 3 carbon atoms, inclusive; Y is a carboxylic acid derived group selected from the group consisting of carboxylic acid represented by the formula —COOH; carboxylic acid salt represented by the formula —COOM wherein M is selected from the group consisting of alkali metals, alkaline earth metals, copper, iron, zinc, cobalt, nickel, ammonium and substituted ammonium wherein said substituted ammonium contains at least one substituent selected from the group consisting of alkyl, hydroxyalkyl and amino substituted alkyl, said alkyl containing from 1 to 20 carbon atoms, inclusive, said hydroxyalkyl containing from 2 to 20 carbon atoms, inclusive, and said amino substituted alkyl containing from 3 to 6 carbon atoms, inclusive; carboxylic acid amide represented by a formula selected from the group consisting of —CONH$_2$, —CONHR$_1$, and —CONR$_1$R$_2$ are independently selected from the group consisting of alkyl, hydroxyalkyl, alkenyl and alkynyl where the total carbon content of the substituents on the amido nitrogen is from 1 to 8 carbon atoms, inclusive; carboxylic acid hydrazide represented by a formula selected from the group consisting of —CONHNH$_2$ and —CONHNHR$_3$ wherein R$_3$ is selected from the group consisting of methyl, ethyl, allyl and phenyl; and carboxylic acid ester represented by the formula —COOR wherein R is selected from the group consisting of alkyl containing from 1 to 18 carbon atoms, inclusive, alkenyl containing from 3 to 18 carbon atoms, inclusive, lower hydroxyalkyl containing from 2 to 10 carbon atoms, inclusive, and lower alkoxyalkyl containing from 2 to 10 carbon atoms, inclusive.

6. A method for controlling the growth of vegetation which comprises applying to the area where control of said vegetative growth is desired, a growth controlling amount of 4-amino-3,5-dichloropicolinic acid.

7. A method for controlling the growth of vegetation which comprises applying to the area where control of said vegetative growth is desired, a growth controlling amount of methyl 4-amino-3,5-dichloropicolinate.

8. A method for controlling the growth of vegetation which comprises applying to the area where control of said vegetative growth is desired, a growth controlling amount of isopropyl 4-amino-3,5-dichloropicolinate.

9. A method for controlling the growth of vegetation which comprises applying to the area where control of said vegetative growth is desired, a growth controlling amount of methyl 3,5-dichloro-4-dimethylaminopicolinate.

10. A method for controlling the growth of vegetation which comprises applying to the area where control of said vegetative growth is desired, a growth controlling amount of 4-amino-3,5-dichloropicolinamide.

11. A method for controlling the growth of vegetation which comprises applying to the area where control of said vegetative growth is desired, a growth controlling amount of 3,5-dichloro-4-methylaminopicolinic acid.

12. A method for controlling the growth of vegetation which comprises applying to the area where control of said vegetative growth is desired, a growth controlling amount of methyl 3,5-dichloro-4-methylaminopicolinate.

13. A method for controlling the growth of vegetation which comprises applying to the area where control of said vegetative growth is desired, a growth controlling amount of potassium 4-amino-3,5-dichloropicolinate.

14. A method for controlling the growth of vegetation which comprises applying to the area where control of said vegetative growth is desired, a growth controlling amount of triethylammonium 4-amino-3,5-dichloropicolinate.

15. A method for controlling the growth of vegetation which comprises applying to the area where control of said vegetative growth is desired, a growth controlling amount of tris(2-hydroxypropyl)ammonium 4-amino-3,5-dichloropicolinate.

References Cited

FOREIGN PATENTS 198,997 8/1958 Austria.
1,239,786 7/1960 France.
1,009,422 5/1957 Germany.

OTHER REFERENCES

Sell, J. Chem. Soc., 99, pt. II, pp. 1679–1684 (1911).

LEWIS GOTTS, *Primary Examiner.*

JAMES O. THOMAS, Jr., *Examiner.*

A. ADAMCIK, *Assistant Examiner.*